March 29, 1966
G. V. LARSEN ETAL
3,242,657
AGRICULTURAL IMPLEMENT
Filed April 30, 1964
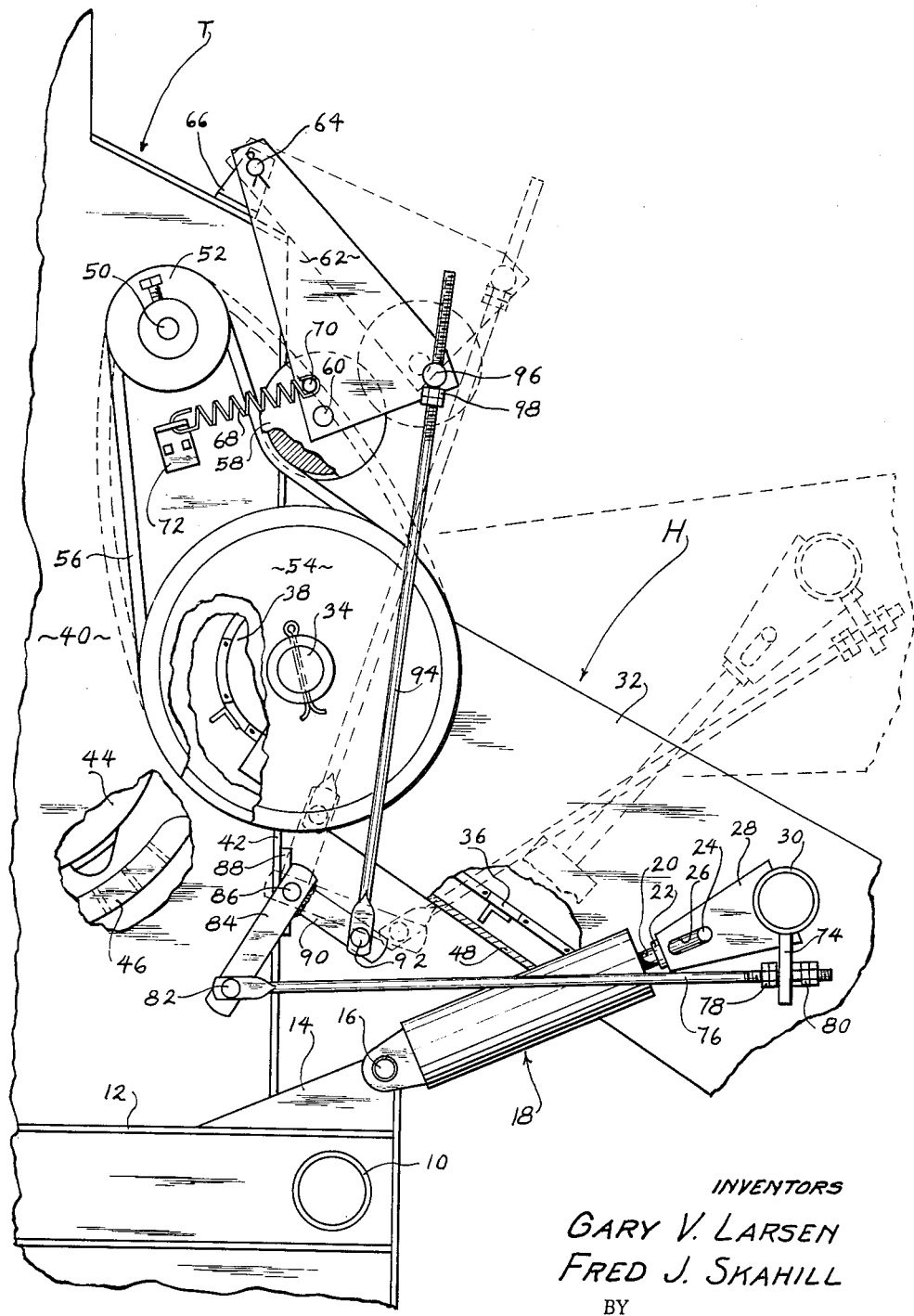
INVENTORS
GARY V. LARSEN
FRED J. SKAHILL
BY
Emerson B. Donnell ATTY.
Robert O. Goslard AGT.

__United States Patent Office__

3,242,657
Patented Mar. 29, 1966

3,242,657
AGRICULTURAL IMPLEMENT
Gary V. Larsen, Moline, Ill., and Fred J. Skahill, Davenport, Iowa, assignors to J. I. Case Company, a corporation of Wisconsin
Filed Apr. 30, 1964, Ser. No. 363,733
5 Claims. (Cl. 56—20)

The present invention relates to agricultural implements, and particularly to combination harvester-threshers, usually known as combines. These machines are of two general types, either self-propelled or pulled behind a tractor, and are characterized by a header or harvester portion which is mounted on and carried by a thresher and separator portion, constituting the major bulk or body of the machine. Such a machine travels over a grain field, harvesting the grain and transmitting it immediately into the thresher portion where it is treated in a cylinder of well-known type, the grain or seed being separated from the straw and the battered straw being discharged from the machine. In such operation, it is not uncommon for the harvester portion of the machine to pick up a stone, stick, bit of metal, or some other foreign object which can, and does do series damage if it gets into the close clearances between the rapidly moving cylinder and the stationary concaves. It is therefore important to be able to promptly stop the operation of the crop transporting means in the harvester portion so that such an object will be prevented from getting into the portions of the machine where it can do harm.

In machines of this general type, it is known to provide means to stop the feeding mechanism and the harvester or header by specific means to prevent the ingestion of a stone or the like, or for other purposes, as indicated by the patents to Krause, 1,820,570, and 1,330,193, assigned to applicant's assignee, and the patent to Hemness, 2,878,634, in which the advantage of such an arrangement is also recognized. These inventions, however, all leave something to be desired, since in each case, the operator has to pull a special rope, step on a pedal, or do something unusual immediately when the emergency arises, and which he may very likely fail to do, or may do improperly in the heat of the danger to his machine, and the present invention ties in the safety procedure with another action with which the operator will become extremely familiar, so that when the time comes he will not forget, but will do the right thing.

For example, the operator is raising and lowering the header continually to cut at the proper height, and to avoid obstructions, so that it becomes almost instinctive to raise the header by the means commonly provided whenever any unusual situation arises. No special or unusual action need be remembered or performed.

The invention is particularly beneficial in a pull type combine, as compared with a self-propelled, since the operator is not in as good a position to see what is going into the header, as he is in a self-propelled combine. As he drives the tractor, the header is behind him. However, he must look ahead much of the time in order to safely guide the outfit. Also the controls on the pull type machine commonly project forwardly into a region where he can reach them by reaching behind him to some extent. The header height control is the most prominent, and the one with which the operator will become most familiar. Therefore, if the safety stop arrangement is made responsive to this height control, it will be in the most favorable position, or situation to be used when needed.

In present practice, it is common to perform the actual controlling operation by hydraulic pressure, and it is not unusual to extend the controls to a spot on the tractor. Again, however, the most familiar control and the one most used, will be the header height control, and to which the operator will most likely turn first if anything goes wrong on the combine. With these points in mind, it is the principal object of the invention to provide a simple, reliable, foolproof and inexpensive clutch or control for the header or feeder mechanism, and which operates automatically when the header is raised, preferably beyond the highest point at which grain is to be cut.

Further objects will become apparent as the specification proceeds.

The drawing shows a fragmentary side elevation of so much of the combine as is necessary for an understanding of the invention, parts being removed and others broken away to show what lies beneath.

Similar reference characters have been applied to the same parts wherever they occur throughout the drawings and the specification. The machine in question comprises a body or thresher portion T, which normally travels toward the right in the drawing, and a harvester portion H, which is hinged to thresher portion T so that it may be raised and lowered to harvest the crop at whatever height is desired. It is to be understood that the machine will have the usual well-known components common to a harvester-thresher, and which have been omitted since they form no part of the invention and would tend to complicate the disclosure and drawings.

The major part of the weight of the machine is carried on an axle 10 strongly braced in suitable structural pieces as a channel iron 12 forming a part of thresher T.

Channel 12 is provided with a buttress or gusset 14 to which is hinged on a pivot pin 16, a hydraulic cylinder or motor 18 having a piston rod 20. Piston rod 20 has a clevis 22 carrying a pin 24 which is engaged in a slot 26 in a bracket plate 28 fixed on a rugged cross member 30, serving as a major strength member in header H.

Also forming part of header H is a feeder housing 32 rigid with cross member 30, and pivoted to thresher T, concentrically with a power input or driven shaft 34, journaled in feeder housing 32.

It will now be apparent that header H will be supported in desired positions by the action of hydraulic motor 18 so that by extending piston rod 20, feeder housing 32 will be swung upwardly about shaft 34 to a height determined by the amount of actuation of cylinder 18. The maximum upward position is indicated in dotted lines in the drawing.

It will also be apparent that shaft 34 may serve to drive any desired mechanism in harvester H, and neither it nor the driven mechanism will be affected in its operation by up-and-down swinging movement of header H.

The header mechanism is represented by a chain type of feed rake 36, which travels in feeder housing 32 about a sprocket 38, fixed on shaft 34, and other components on header H may get their power from shaft 34 as is common and well known.

Thresher housing T has a side wall 40 and a front wall 42 and houses a cylinder of well-known type 44, cooperating with a concave 46. Feed rake 36, upon rotation a sprocket 38, slides the crop material beneath itself along a deck portion 48 of feeder house 32 and delivers the material between cylinder 44 and concave 46. Being of considerable length, the journey from the ground to cylinder 44 takes an appreciable period of time, for example several seconds, and the same would be true of a stone, bolt, or the like, which might be picked up along with the harvested crop. For this reason, an operator has a reasonable time in which to save the situation if he is aware of the fact that the combine has picked up such an object, since ordinarily little if any damage is done until the object gets to cylinder 44.

Thresher housing T also carries a driving shaft 50 which is rotated by the power source on the combine, and from which the drive is extended to the header mechanism. Shaft 50 carries a pulley 52, while above-mentioned shaft 34 carries a pulley 54, and a belt 56 is disposed about pulleys 52 and 54 in driving relation therewith. Belt 56 however, is purposely made of excessive length so as to require a tightener sheave 58. Sheave 58 is journaled on a pin 60 fixed on an idler arm 62, which is pivoted to a pivot 64 carried on a bracket 66, fixed on the upper part of thresher body T. Tightener arm 62 is swung in a clockwise direction in the figure, by means of a tension spring 68 fastened to arm 62 on a pin 70, and anchored to wall 40 on an outstanding bracket 72. The resilient pull of spring 68 therefore maintains sheave 58 against belt 56 and maintains it tight enough to drive pulley 54 by reason of rotation of pulley 52. However, removal of the pressure of sheave 58 would allow belt 56 to relax to the dotted position shown whereupon it would be too slack to continue the drive to pulley 54 so that feed rake 36 and any other mechanism chosen to be driven thru shaft 34 would immediately cease operation. Such removal of the pressure of sheave 58 is brought about by raising of header H.

Header cross member 30 has a lug 74 fixed therewith providing a bore thru which extends a pull rod 76. Lock nuts 78 and 80 prevent any appreciable lengthwise movement of rod 76 in lug 74, but provide for adjustment of the effective length of rod 76. Rod 76 is pivoted on a pin 82 to the downwardly extending arm 84 of a bell crank having a fulcrum portion 86. Fulcrum 86 is journaled in the present instance on front wall 42, as by suitable bearing means 88. Fulcrum portion 86 also carries a forwardly extending arm 90, to which is pivoted on a pin or the like 92, an upwardly directed push rod 94. Rod 94 extends thru a suitable bore in a rocker pin 96 journaled in tightener lever or arm 62 forwardly of pin 60. Rod 94 is threaded for a considerable distance where it passes thru rocker pin 96 and has a lock nut 98 which normally engages the underside of pin 96. Upward movement of cross member 30 about shaft 34 will pull on rod 76 and rock bell crank arm 84 in a counterclockwise direction. This will raise push rod 94 and swing tightener arm 62, also in a counterclockwise direction.

As shown, the parts will remove sheave 58 entirely from belt 56 when header H is in its extreme upward position. However, by adjustment of nut 98, this effect may be made to take place at any desired point in the upward movement of header H, and in ordinary operation, it would be desirable to have the drive disabled at a point not very far above the highest point at which harvesting of grain would be done, under any given conditions. As will be apparent, this point may be readily changed as new conditions present themselves.

The operation of the device has been described as the structure was outlined, and no further description is deemed necessary, it being apparent that a construction has been devised which will accomplish the objects of the invention.

Variations of the invention will doubtless occur to those skilled in the art, and the invention is not intended to be taken as limited by the precise disclosure, or in fact, in any manner except as defined in the claim.

What is claimed as new and desired to be secured by Letters Patent of the United States is:

1. A header drive control for use in a combine of the type including a thresher housing, a threshing cylinder operatively supported within said thresher housing, a driving element rotatably supported from the thresher housing, actuating means extending from said driving element, a header and feeder housing mounted on said thresher housing for up-and-down movement relative to said thresher housing, means for raising and lowering said header and feeder housing, means in said header and feeder housing connected in actuated relation with said actuating means for transferring crop material through said header and feeder housing to said cylinder, said header drive control comprising
    means connected to said header and feeder housing and responsive to raising movement of said header and feeder housing for disabling said actuating means whereby to stop the action of said crop transferring means whenever said header is raised.

2. A header drive control for use in a combine of the type including a thresher housing, a threshing cylinder operatively supported within said thresher housing, a driving element rotatably supported from the thresher housing, actuating means extending from said driving element, a header and feeder housing mounted on said thresher housing for up-and-down movement relative to said thresher housing, means for raising and lowering said header and feeder housing, means in said header and feeder housing connected in actuated relation with said actuating means for transferring crop material through said header and feeder housing to said cylinder, said header drive control comprising
    means connected to said header and feeder housing and responsive to raising movement of said header and feeder housing for disabling said actuating means whereby to stop the action of said crop transferring means whenever said header is raised a predetermined amount, and
    means on said header for adjusting the point in the raising of said header and feeder housing at which said actuating means will be disabled.

3. A header drive control for use in a combine of the type including a thresher housing, a threshing cylinder operatively supported within said thresher housing, a driving element rotatably supported from the thresher housing, actuating means extending from said driving element, a header and feeder housing mounted on said thresher housing for up-and-down movement relative to said thresher housing, means for raising and lowering said header and feeder housing, means in said header and feeder housing connected in actuated relation with said actuating means for transferring crop material through said header and feeder housing to said cylinder, said header drive control comprising
    clutch means connected to said driving element and to said crop material transferring means in driving relation thereto, and
    means connected to said header and feeder housing in position to be responsive to said up-and-down movement, and said means being connected to said clutch means in position to release said clutch means upon raising of said header and feeder housing by said raising means, to stop the operation of said crop material transferring means.

4. A header drive control for use in a combine of the type including a thresher housing, a threshing cylinder operatively supported within said thresher housing, a driving element rotatably supported from the thresher housing, actuating means extending from said driving element, a header and feeder housing mounted on said thresher housing for up-and-down movement relative to said thresher housing, means for raising and lowering said header and feeder housing, means in said header and feeder housing connected in actuated relation with said actuating means for transferring crop material through said header and feeder housing to said cylinder, said header drive control comprising a
    driving pulley on said driving element, a
    driven pulley on said header and feeder housing, said actuating means comprising a
    belt engaged about said driving and driven pulleys, a
    tightener arm fulcrumed on the combine and extending to the vicinity of said belt in the region between said pulleys, an
    idler sheave on said tightener arm in position to be pressed against said belt by swinging of said tightener arm in one direction,
    means connected to said tightener arm and to said thresher housing for urging said tightener arm in the direction to press said idler sheave against said belt, and means connected with said header and feeder housing and with said tightener arm in position to swing said tightener arm and said idler sheave away from said belt and stop the operation of said crop material transferring means by reason of upward movement of said header and feeder housing.

5. A header drive clutch for use in a combine of the type including a thresher housing, a threshing cylinder operatively supported within the thresher housing, a driving shaft rotatably supported from the thresher housing, a driven shaft rotatably supported from said thresher housing, a header and feeder housing mounted on said thresher housing for up-and-down pivotal movement about said driven shaft, means for raising and lowering said header and feeder housing about said driven shaft, means in said feeder housing connected in actuated relation with said driven shaft for transferring crop material to said cylinder, said header drive clutch including a link connected with said feeder housing at a point spaced from said driven shaft, a bell crank fulcrumed on said thresher housing and having a driven arm connected with said link and extending transversely thereof and a driving arm rigid with said driven arm, a link leading transversely from said driving arm, a driving pulley fixed on said driving shaft, a driven pulley fixed on said driven shaft, a belt disposed about said pulleys, a tightener arm fulcrumed upwardly of said driven pulley on said thresher housing and extending to the vicinity of said belt in the region between said pulleys, an idler sheave upwardly of said driven pulleys on said tightener arm in position to be pressed against said belt by swinging of said tightener arm in one direction, a spring connected to said tightener arm and to said thresher housing and stressed to urge said tightener arm in the direction to press said idler sheave against said belt, and the last-mentioned link being connected to said tightener arm at a point spaced from the connection of said tightener arm to said thresher housing in position to swing said tightener arm away from said belt and thereby stop the operation of said crop material transferring means whenever said feeder housing is raised a sufficient amount.

References Cited by the Examiner
UNITED STATES PATENTS

| 2,306,755 | 12/1942 | Ronning | 56—10 X |
| 2,452,153 | 10/1948 | Ronning et al. | 56—208 |
| 2,528,275 | 10/1950 | Heth | 56—20 |
| 2,732,676 | 1/1956 | Bernier | 56—10 |

ANTONIO F. GUIDA, *Acting Primary Examiner.*